United States Patent [19]

Bateman et al.

[11] Patent Number: 4,645,479
[45] Date of Patent: Feb. 24, 1987

[54] METAL TRANSMISSION BELT

[75] Inventors: Paul M. Bateman, Dryden; John C. Warner, Trumansburg, both of N.Y.

[73] Assignee: Borg-Warner Corporation, Chicago, Ill.

[21] Appl. No.: 328,319

[22] Filed: Dec. 7, 1981

Related U.S. Application Data

[63] Continuation of Ser. No. 142,549, Apr. 21, 1980, abandoned.

[51] Int. Cl.$^4$ ............................ F16G 5/16; F16G 5/18
[52] U.S. Cl. .................................... 474/242; 474/201; 474/248; 474/272
[58] Field of Search ............... 474/237, 242, 244, 245, 474/248, 250, 251, 272, 273, 201

[56] References Cited

U.S. PATENT DOCUMENTS

| | | |
|---|---|---|
| 754,238 | 3/1904 | Reeves ................................. 474/245 |
| 801,451 | 10/1905 | Fouillaron ........................... 474/201 |
| 2,038,583 | 4/1936 | Maurer . | 
| 2,403,607 | 7/1946 | Ogard ................................... 474/242 |
| 2,475,264 | 7/1949 | Sutton . | 
| 3,720,113 | 3/1973 | Van Dorne et al. . | 
| 3,949,621 | 4/1976 | Beusink et al. ....................... 474/242 |
| 4,080,841 | 3/1978 | Vollers ................................. 474/201 |
| 4,313,730 | 2/1982 | Cole et al. ........................... 474/245 |

FOREIGN PATENT DOCUMENTS

| | | | |
|---|---|---|---|
| 87679 | 3/1922 | Austria ................................. 474/201 |
| 499902 | 2/1954 | Canada ................................ 474/201 |
| 7628 | 7/1907 | France ................................. 474/201 |
| 900474 | 10/1944 | France ................................. 474/201 |
| 121350 | 4/1948 | Sweden ................................ 474/242 |
| 1329 | of 1907 | United Kingdom ................ 474/201 |
| 28211 | of 1914 | United Kingdom ................ 474/245 |

Primary Examiner—Lawrence Staab
Attorney, Agent, or Firm—James A. Geppert

[57] ABSTRACT

A flexible power transmission means comprising an assembly of a pair of spaced, generally parallel chains, each constructed of a plurality of sets of interleaved links. Each set is joined to its next adjacent set by a pin, each pin serving both chains. Generally trapezoidal-shaped load blocks are located between the chains and having cut-outs in the sides locating the chains. The load blocks are generally contoured at their edges to fit into the V of a pulley and are disposed between the chains. The load is carried by the chains and its pins. The load blocks are longitudinally positioned with respect to the chains by the chains' pins.

1 Claim, 5 Drawing Figures

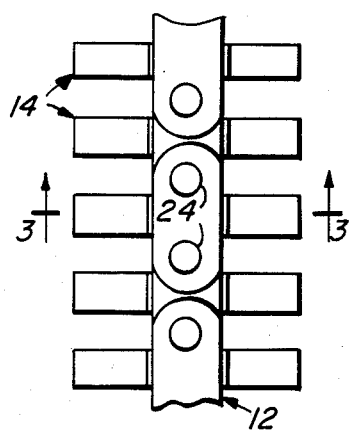
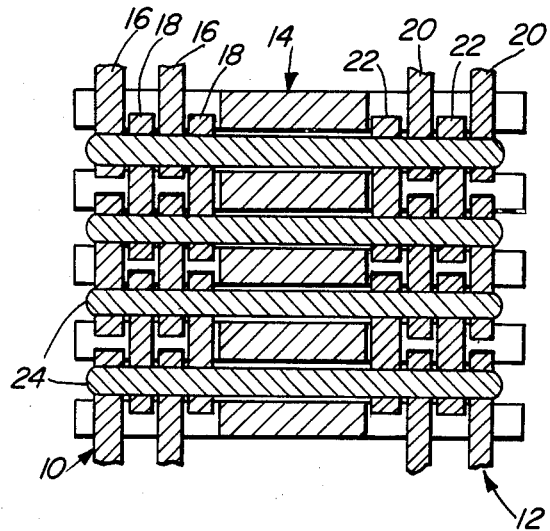
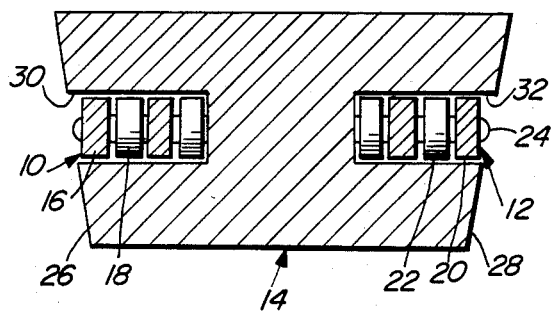
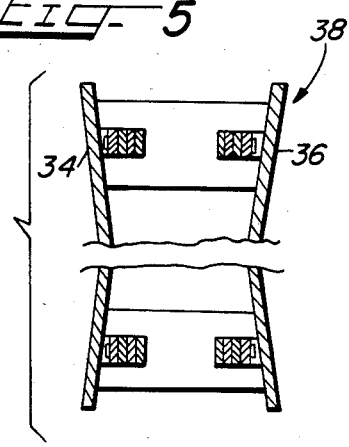
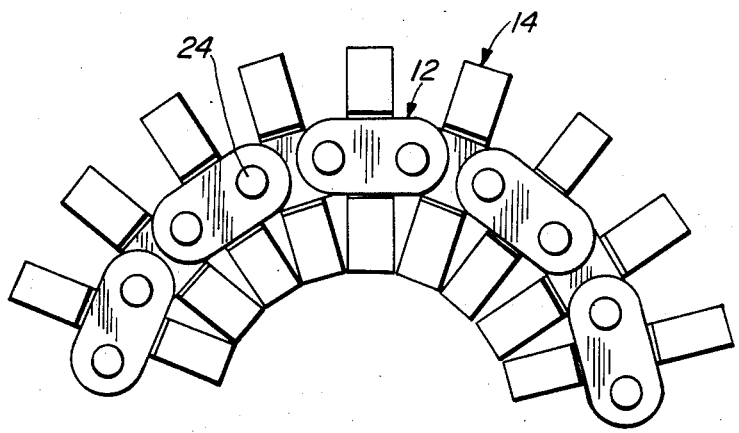

METAL TRANSMISSION BELT

This is a continuation of application Ser. No. 142,549 filed Apr. 21, 1980, now abandoned.

BACKGROUND OF THE INVENTION

Flexible power transmission means comprising an assembly of a plurality of superimposed steel strips and a plurality of V-shaped blocks of metal are known in the art. An example of such construction is disclosed in U.S. Pat. No. 3,720,113 granted Mar. 13, 1973 to H. J. Van Doorne et al. In the patented structure, the blocks are provided with lateral guides having top edges which overlie the steel strips to maintain the parts in assembled relationship. The load is carried by the blocks and the blocks can slide along the band.

Another example of a flexible power transmission means is described in U.S. Pat. No. 3,949,621 granted Apr. 13, 1976 to Beusink, deceased, et al in which metal plates are mounted on metal strips, the strips being received in slots in one of the lateral edges of the plates.

Other flexible power transmission means comprising an assembly of links, pins and pulley contact members are described in U.S. Pat. Nos. 2,038,583, granted Apr. 28, 1936 to Maurer and 2,475,264, granted July 5, 1949 to Sutton.

THE INVENTION

According to the invention to be described herein, a flexible power transmission means comprising a pair of spaced, generally parallel chains, each chain being an assembly of a plurality of interleaved sets of links, each set being joined to its next adjacent set by a pin which serves both chains to permit articulation of the sets of links. Generally trapezoidal, load blocks are located between the pins and space the chains, each load block having cut-out in the opposed sides to receive the links. The load is carried by the chains and its pins; the blocks are longitudinally positioned by the chain's pins.

THE DRAWINGS

FIG. 1 is a partial side view of a portion of a flexible power transmission means according to this invention;

FIG. 2 is a sectional view taken on line 2—2 of FIG. 1;

FIG. 3 is a partial sectional view of the means of FIG. 1 taken on line 3—3 of FIG. 1;

FIG. 4 is a partial side view similar to FIG. 1 but showing the articulation of the structure around a sheave or pulley;

FIG. 5 is a partial sectional view similar to FIG. 3 showing a pulley with which the means may be used.

DETAILED DESCRIPTION

The power transmission means of this invention comprises a pair of spaced chains 10, 12 and a plurality of generally trapezoidal load blocks 14. Each chain 10 and 12 comprises sets of interleaved links 16, 18 and 20, 22, respectively, which are joined by pins 24. The load blocks 14 have tapered sides 26, 28 and cut-outs 30 and 32, each to receive a portion of a chain and each load block 14 is located between the next adjacent pins 24. Thus the load blocks 14 are longitudinally positioned by the chains' pins 24, and the load is carried by the pins and the chains. The load blocks 14 may be described as generally I-shaped in section.

The tapered sides 26, 28 of each load block 14 may be roughened to enhance the frictional contact with the flanges 34, 36, respectively of a pulley 38. In actual use, the assembly connects spaced pulleys to provide a drive therebetween, the pulleys may be of a variable nature so that the drive ratio therebetween is variable, as is known in the art.

The load blocks 14 may be constructed of steel or other suitable material and can be stamped from strip material; the chain links are generally stamped from sheet metal ribbon stock and the pins are generally die formed metal stock. The opposite ends of the pins can be upset to retain the assembly of links, or in a preferred embodiment, the outside links of the chains are press-fit on the pins during the assembly of the links and load blocks while the inner links are slip-fit on the pins.

We claim:

1. An endless power transmission belt especially adapted for drivingly connecting at least a pair of pulleys in a pulley transmission and comprising the combination of metal links, pivot means and load blocks, the links being arranged in laterally arranged sets with the links of the next adjacent sets laced together and pivotably interconnected by said pivot means, said pivot means also joining corresponding laterally arranged sets to thus provide an integral chain with laterally spaced and joined sets of links, and a metal load block located between each adjacent pivot means and substantially filling the space between each said adjacent pivot means, each load block having lateral edges shaped to frictionally engage the pulleys of a pulley transmission and a pair of cut-out slot-like openings intersecting and opening to opposite edges of said block and defining a generally centrally located block portion which spaces a lateral set of links and applies a load to at least one of the pivot means adjacent thereto.

* * * * *